(12) United States Patent
Ivanov et al.

(10) Patent No.: US 8,806,512 B2
(45) Date of Patent: *Aug. 12, 2014

(54) COLLOCATION IN A JAVA VIRTUAL MACHINE OF JSLEE, SIP SERVLETS, AND JAVA EE

(75) Inventors: Ivelin Atanasoff Ivanov, Austin, TX (US); Jean Deruelle, Dechy (FR)

(73) Assignee: Red Hat, Inc., Raleigh, NC (US)

( * ) Notice: Subject to any disclaimer, the term of this patent is extended or adjusted under 35 U.S.C. 154(b) by 1116 days.

This patent is subject to a terminal disclaimer.

(21) Appl. No.: 12/156,301

(22) Filed: May 30, 2008

(65) Prior Publication Data

US 2009/0300155 A1    Dec. 3, 2009

(51) Int. Cl.
*G06F 3/00*    (2006.01)

(52) U.S. Cl.
USPC ......................................... 719/328

(58) Field of Classification Search
None
See application file for complete search history.

(56) References Cited

U.S. PATENT DOCUMENTS

2002/0194397 A1* 12/2002 Creamer et al. .............. 709/328

OTHER PUBLICATIONS

JAIN SLEE Tutorial by Lim et al. 2003, 41 pages.*
A SLEE for all Seasons by Open Cloud. May 11, 2007, 12 pages.*
JAIN SLEE 1.0 Specification, Final Release, Lim et al. 2002, 284 pages.*
The JBOSS JMX Microkernel, Chapter 2, Oct. 19, 2005, 90 pages.*
Sun Microsystems, "JAIN Technology: Serving the Developer Community", <http://java.sun.com/products/jain/jain0503.pdf>, Aug 26, 2003, 69 pages.*
Ferry, David. "JAIN SLEE 1.1 Specification, Public Review Draft", 2006. Sun Microsystems, 522 pages.*
"JBoss Communications Platform", *Red Hat*, (Sep. 2007), 1-39 pgs.
"MobiCents: Installation Instructions from the binary", http://www.mobicents.org-a.googlepages.com/installation.html, (2006), 1-2 pages.
"MobiCents: JAIN-SLEE/Sip servlets Interperability Demo", http://www.mobicents.org-a.googlepages.com/jslee-sips-interop-demo.html., (2006), 1-2 pages.
Ivanov, Ivelin , "Mobicents: JSLEE for the People, by the People", *Mobicents*, http://today.java.net/pub/a/today/2006/03/09/mobicents-jslee.html. / 14. May 14, 2008., (Mar. 14, 2006), 1-4 pgs.
Ivanov, Ivelin , "The First Certified Open Source Implementation of JAIN-SLEE 1.0", *Mobicents, Java.net Communications Community JavaOne*, (2005), 1-22 pgs.
Ivanov, Ivelin , et al., "The Mobicents Open Source SLEE Platform", *MobiCents*, (Fall 2005), 1-52 pgs.
Ranganathan, M. , et al., "Implementing JAIN-SLEE on the JBoss AS: The Mobicents Open SLEE Project", *JBoss World*, NIST Advanced Networking Technologies Dvision and University of Genoa, (2005), 1-47 pgs.
Wunderlich, Thomas , et al., "Red Hat France Telecom RFI: Mobicents", *Red Hat*, (Mar. 12, 2008), 1-30 pgs.

(Continued)

*Primary Examiner* — H S Sough
*Assistant Examiner* — Carina Yun
(74) *Attorney, Agent, or Firm* — Lowenstein Sandler LLP

(57) ABSTRACT

In one embodiment, a mechanism for collocation in a JAVA Virtual Machine of JSLEE, SIP Servlets, and JAVA EE is disclosed. In one embodiment, a system includes an integrated application server including Java™ APIs for Intelligent Networks Service Logic Execution Environment (JSLEE), one or more Session Initiation Protocol (SIP) Servlets, and Java™ Enterprise Edition (J2EE). In addition, the system includes one or more resource adapters communicably coupled to the integrated application server and one or more management interfaces communicably coupled to the integrated application server.

20 Claims, 6 Drawing Sheets

(56) References Cited

OTHER PUBLICATIONS

"Google Code: Mobicents", http://code.google.com/p/mobicents/source/browse/tags/B1.2.02-libraries_remove/examples/3pcc, 1 page (Sep. 8, 2008).

"Google Groups", http://groups.google.com, 1 page (Sep. 8, 2008).

"Google: MobiCents", http://code.google.com/p/mobicents/w/list, 1 page (May 14, 2008).

"java.net: Mobicents Frequently Asked Questions", http://wiki.java.net/bin/view/Communications/MobicentsFAQ, 4 pages (Mar. 14, 2006).

"JBoss.org Community Documentation", http://groups.google.com/group/mobicents-public/web/chapter-introduction.html, 1 page (Sep. 8, 2008).

"MobiCents", http://www.mobicents.org-a.googlepages.com/products.html, 2 pages (2006).

"MobiCents-Public: Converged Application Demo", http://groups.google.com/group/mobicents-public/web/converged-application-demo, 3 pages (Nov. 14, 2007).

"MobiCents: Google Code", http://code.google.com/p/mobicents/, 2 pages (Sep. 8, 2008).

"MobiCents: Installation Instructions from the source", http://www.mobicents.org-a.googlepages.com/installation-jboss.html, 4 pages (2006).

"MobiCents: JAIN SLEE (Service Level Execution Environment)", http://www.mobicents.org-a.googlepages.com/products_jain_slee.html, 2 pages (2006).

"Mobicents: JSLEE for the People, by the People", http://today.java.net/lpt/a/273, 4 pages (Mar. 14, 2006).

"MobiCents: Red Hat launches JBoss Communications Platform", http://www.mobicents.org/index.html, 1 page (2007).

"MobiCents: Sip Servlets", http://www.mobicents.org-a.googlepages.com/products_sip_servlets.html, 2 pages (2006).

USPTO, Office Action for U.S. Appl. No. 12/156,329 mailed on Oct. 27, 2011.

USPTO, Final Office Action for U.S. Appl. No. 12/156,329 mailed on Mar. 21, 2012.

USPTO, Advisory Action for U.S. Appl. No. 12/156,301 mailed on May 21, 2012.

USPTO, Office Action for U.S. Appl. No. 12/156,329 mailed on Dec. 17, 2012.

USPTO, Final Office Action for U.S. Appl. No. 12/156,329 mailed Apr. 5, 2013.

USPTO, Advisory Action for U.S. Appl. No. 12/156,329 mailed Jun. 18, 2013.

USPTO, Office Action for U.S. Appl. No. 12/156,329 mailed Aug. 5, 2013.

USPTO, Final Office Action for U.S. Appl. No. 12/156,329 mailed Jan. 10, 2014.

* cited by examiner

COLLOCATION IN A JAVA VIRTUAL MACHINE OF JSLEE, SIP SERVLETS, AND JAVA EE

TECHNICAL FIELD

The embodiments of the invention relate generally to communication platforms and, more specifically, relate to a mechanism for collocation in a Java™ virtual machine of JSLEE, SIP Servlets, and Java™ EE.

BACKGROUND

Voice over Internet Protocol (VoIP) has seen a rise in popularity in recent times and has become more than just a telephony application. For instance, several highly popular applications have come into existence like Skype™, Google Talk™, and MSN Messenger™. All of these applications combine voice, instant messaging (IM), and other modes of communication into unified clients and greatly enhance the user experience. Previously, these means to communicate were islands—largely isolated from each other. However, engineers visited them and found large areas of community between these different modes of communication, resulting in integrated clients that have changed the way in which communication and business is conducted.

For integrated communication applications, such as those described above, server support needs to be provided. An examination of the structure of such applications indicates that there are two parts to the application: the signaling part and the media part. The signaling part is an event-oriented activity. Network endpoints exchange one-way messages through various servers and signal the establishment of a session. Interesting services can be built by placing fragments of code, or "event handlers," in the signaling path at the server. Furthermore, service providers may speed up their innovation processes and quickly launch new services if they use a standards-based component model and container architecture.

One standards-based application execution framework is JAIN SLEE or JSLEE. JAIN is an acronym for "Java APIs for Intelligent Networks." JAIN aims for an enabling set of Java APIs to develop and deploy service-driven network applications. SLEE is an acronym for "service logic execution environment." Together, JAIN SLEE is an application execution framework analogous to the Java™ Enterprise Edition (J2EE) environment. However, in comparison to J2EE, JSLEE's design principles explicitly aim for a low latency (<100 ms) and high throughput (thousands of events per second) environment optimized for asynchronous event processing, including transaction handling, high reliability, a distributed component model, and a standardized framework. Appropriately, JSLEE was designed for a network signaling environment, which is ideal for a communications platform.

Another protocol developed for signaling is Session Initiation Protocol (SIP). This important signaling protocol for the telecommunications industry is rapidly moving to next-generation applications. Java™ is an excellent platform for SIP development, especially on the server side. Similar to JSLEE, SIP servlets are a container-based specification. SIP servlets were designed to simplify SIP development by building container functionality on top of a SIP stack for programming convenience. SIP servlets integrate a SIP stack into the container to talk to the SIP network, which can be viewed as a library built upon a SIP stack hiding complexity from the application developer. In addition, SIP servlets are built upon the servlet concept, with the service logic coded in the SIP servlet, for a common programmatic feel.

JSLEE and SIP Servlets each address unique requirements for communications applications that are not addressed by the execution environment of J2EE. As a result, a way to integrate the robust component model and scalability characteristics designed for high-volume, low-latency signaling of JSLEE with the simple programming model and light-weight specification of SIP servlets, and with the established and well-known modular architecture of J2EE in a single Java™ virtual machine would be beneficial.

BRIEF DESCRIPTION OF THE DRAWINGS

The invention will be understood more fully from the detailed description given below and from the accompanying drawings of various embodiments of the invention. The drawings, however, should not be taken to limit the invention to the specific embodiments, but are for explanation and understanding only.

DETAILED DESCRIPTION

Figure 1:
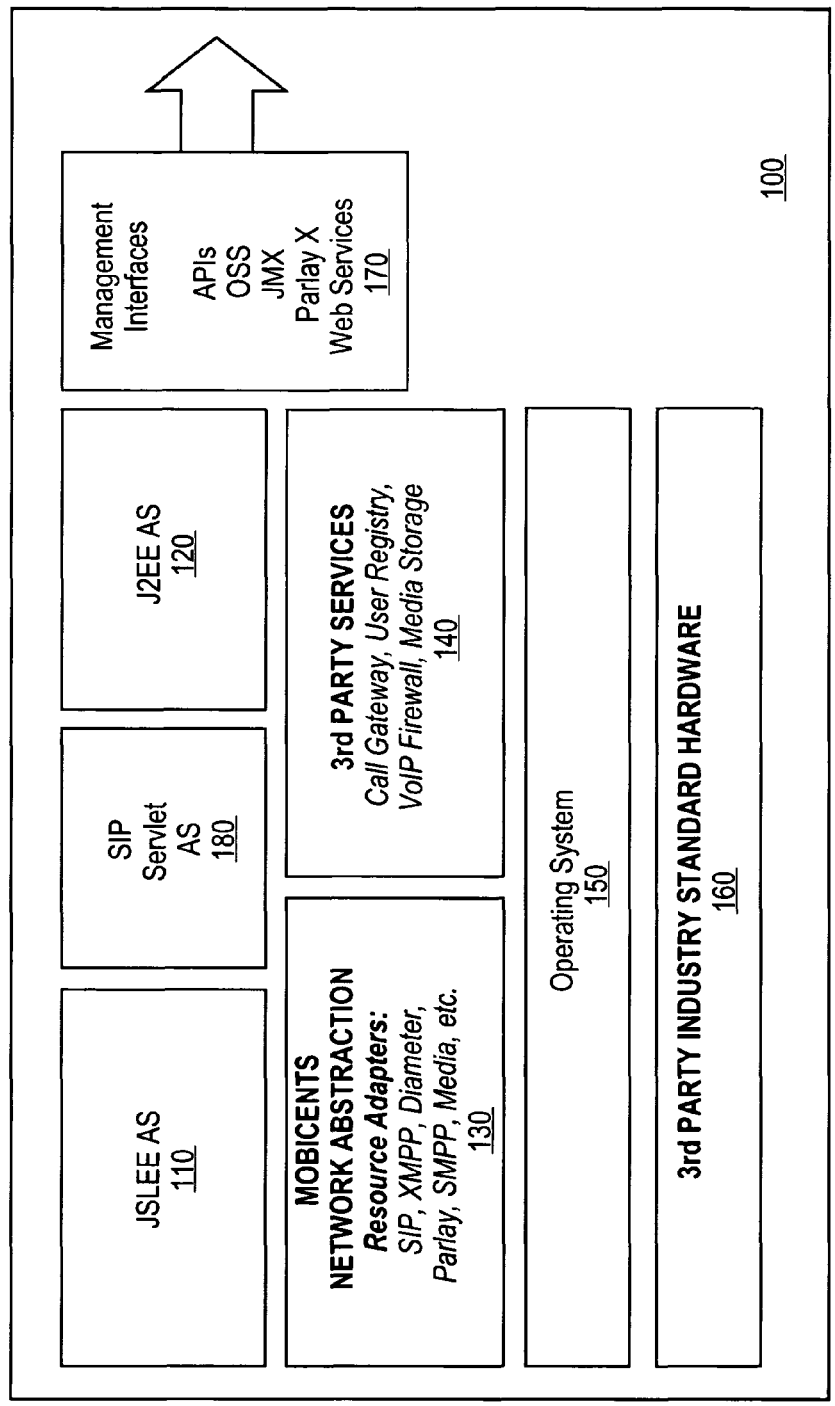
FIG. 1 is a block diagram of a communications platform that integrates JSLEE and SIP Servlets as an extension of J2EE according to an embodiment of the invention.

Embodiments of the invention provide for collocation in a Java™ virtual machine of Java™ APIs for Intelligent Networks Service Logic Execution Environment (JSLEE), SIP Servlets, and Java™ Enterprise Edition (J2EE). In one embodiment, a system for collocation in a JSLEE, SIP Servlets, and J2EE includes an integrated application server including JSLEE, one or more Session Initiation Protocol (SIP) Servlets, and J2EE. In addition, the system includes one or more resource adapters communicably coupled to the integrated application server and one or more management interfaces communicably coupled to the integrated application server.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "sending", "receiving", "attaching", "forwarding", "caching", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical or other form of propagated signals (e.g., carrier waves, infrared signals, digital signals, etc.)), etc.

Embodiments of the invention provide for collocation in a Java™ virtual machine (JVM) of JSLEE, Session Initiation Protocol (SIP) Servlets, and Java™ EE (J2EE). FIG. 1 is a block diagram depicting a communications platform 100 that integrates JSLEE and SIP Servlets as an extension of J2EE according to an embodiment of the invention. In one embodiment, communications platform 100 is a single JVM. A JVM is a set of computer software programs and data structures that use a virtual machine model for the execution of other computer programs and servers. Communications platform 100 enables the creation, deployment, and management of services and applications that integrate voice, video, and data. It also functions seamlessly across a range of Internet Protocol (IP) and communications networks, and can be accessed by computers, handsets, and other network-enabled devices.

Communications platform 100 includes an integrated JSLEE Application Server (AS) 110, a SIP Servlet AS 180, and a J2EE AS 120. The integrated JSLEE, SIP Servlet, and J2EE application servers combine JSLEE and SIP Servlet specifications with J2EE to enable the development, deployment and management of applications that integrated of voice, video and data across a range of networks and devices.

JSLEE enables web applications to interface with communications networks and devices. JSLEE is the J2EE for communications, as it is event driven, high throughput, and low latency. On the other hand, SIP Servlets bridge the gap between communications and enterprise systems. SIP Servlets provide a simple programming model by providing a server-side interface describing a container of SIP components or services, to make development of SIP services simple.

In one embodiment, the integrated JSLEE 110, SIP Servlets 180, and J2EE 120 application servers are a single integrated stack, with JSLEE, SIP Servlets, and J2EE running in the same JVM 100. As illustrated, the hierarchy of components supporting the integrated JSLEE AS 110, SIP servlet AS 180, and J2EE AS 120 components include a JSLEE network abstraction component 130, third party services 140, an operating system 150, and third party industry standard hardware 160. Also depicted in FIG. 1 are JSLEE APIs 170 to interface with other outside applications. In one embodiment, the J2EE component 110 may be a JBoss™ application server distributed by Red Hat, Inc. of Raleigh, N.C. In another embodiment, the operating system may be Red Hat™ Enterprise Linux system.

In one embodiment, network abstraction component 130 provides a network abstraction layer for the communications platform 100. The network abstraction layer provides connectivity between applications of the communications platform 100 and any network environment, including an IP network or a Legacy network. In this way, application logic is network protocol agnostic so that the application developer is insulated from the underlying network protocol, and thereby simplifies porting between networks. The network abstraction is achieved by the external resources via Resource Adapters (RAs). For example, RAs may include, but are not limited to, Session Initiation Protocol (SIP), Extensible Messaging and Presence Protocol (XMPP), GoogleTalk, Asterisk, Parlay, Diameter, Media, Real-Time Transport Protocol (RTP), Short Message Peer-to-Peer Protocol (SMPP), Intelligent Network Application Part (INAP), HyperText Transport Protocol (HTTP), and Production Rules.

In one embodiment, management interfaces 170 provide third party application programming interfaces (APIs). These third party APIs simplify integrating with core business systems. For example, some of the management functions provided by management interfaces 170 may include, but are not limited to, full visibility for monitoring and management via JMX, internal system APIs (Event Router, Activities, Time Facility), RA APIs, and application APIs (service usage, service building blocks usage, event traffic control). Third party APIs also provide Operational/Business Support Systems (OSS/BSS) connectivity.

In one embodiment, the use of the modular J2EE architecture with JSLEE and SIP Servlets results in a simple and cleanly separable architecture for the implementation of embodiments of the invention. Each management interface mandated by the JSLEE and SIP Servlets are installed as logically separate microkernel service of the J2EE. The J2EE microkernel architecture allows JSLEE and SIP Servlets to work with a minimal set of installed J2EE services, thus making for an integrated, extensible, and modular architecture. In particular, embodiments of the invention provide for the integrated J2EE, JSLEE, and SIP Servlet environment by enabling the J2EE components and SIP Servlet components (such as HTTP Servlets, SIP Servlets, and EJBs) to communicate with the JSLEE components (such as SBBs) via local in-VM passes by reference semantics.

It should also be noted that JSLEE and SIP Servlets are not J2EE specifications. However, they may utilize many J2EE components and facilities, such as JMX and Transactions. For example, some useful J2EE services and tools may include, but are not limited to, JBoss™ Cache, Java™ Management Extensions (JMX), Java™ Naming and Directory Interface (JNDI), JavaAssist™, and JBoss™ clustering.

Figure 2:
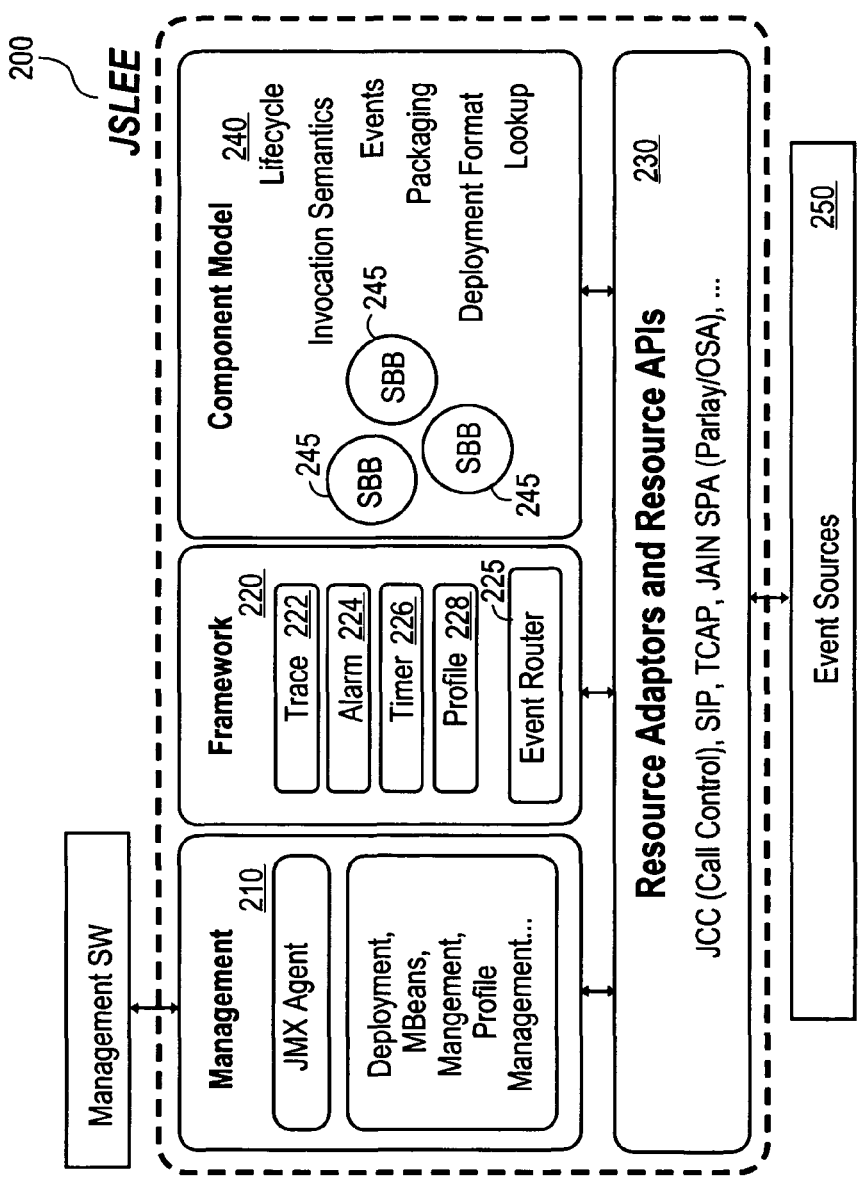
FIG. 2 is a block diagram illustrating a JSLEE architecture according to an embodiment of the invention.

To better understand the integration of JSLEE, SIP Servlet, and J2EE into a single JVM, such as shown in communications platform 100 of FIG. 1, a closer look at the building blocks for one of the components, JSLEE, may be helpful in understanding the co-operation of all of the components of the communications platform of embodiments of the invention. FIG. 2 is a block diagram illustrating a JSLEE architecture according to an embodiment of the invention. The JSLEE architecture 200 consists of four main areas: management 210, framework 220, resource adaptors (RAs) 230, and the component model 240.

In one embodiment, the management entities 210 allow the whole JSLEE environment 200 to be managed through Java™ Management Extensions (JMX) MBeans. The various entities in the framework 220 support the business logic implemented in distributed components—the service building blocks (SBBs) 245. Within the framework 220, the trace entity 222 allows a centralized and single point for logging, the alarm entity 224 informs external management systems, the timer entity 226 invokes components in pre-defined intervals, and the profile entity 228 provides the business logic with information and data during execution. The event router 225 of the framework 220 routes incoming and newly created events to previously registered SBBs and resources. The event router 225 is more or less the heart of JSLEE's event routing system.

Resource adaptors 230 bridge the component model 240 and the underlying event infrastructure. An event source 250 from the event infrastructure could be anything emitting events, implemented in any language or environment. The resource adaptor 230 converts incoming protocols and network-specific events into generic, semantically equivalent JAVA events and fires them into the JSLEE application server 200 for further processing. As a result, the application and the source of events 250 are logically decoupled so that applications may execute on any network.

The component model 240 defines how components interact with each other and with the environment, the bundling of services, and their deployment. The JSLEE environment 200 invokes SBBs 245 according to a standardized lifecycle model for SBBs, comparable to an Enterprise JAVA Bean's (EJB's) lifecycle. The runtime environment secures and manages event processing and framework invocation with transactions. Doing so, the JSLEE application server 200 remains in a defined and consistent state even in case of failure.

A service is essentially a management artifact in JSLEE and is bundled as a jar file. A JSLEE container may simultaneously house several services. Each service is a logical grouping of functionality and consists of several SBBs 245. Among them, there is a distinguished SBB called the root SBB (not shown) that is automatically instantiated by the JSLEE container. If appropriate, this root SBB instantiates child SBBs and routes events to these children.

In one embodiment, JSLEE and SIP Servlets both rely on the J2EE microkernel architecture to standardize the management interface, as the J2EE microkernel architecture is a natural fit for integrating JSLEE and SIP servlets with J2EE. In one embodiment, the JSLEE specification and the SIP Servlet specification are services in the JMX kernel of J2EE. In other embodiments, other similar frameworks may be utilized for the microkernel architecture of J2EE including Open Service Gateway initiative (OSGi), for example.

Figure 3:
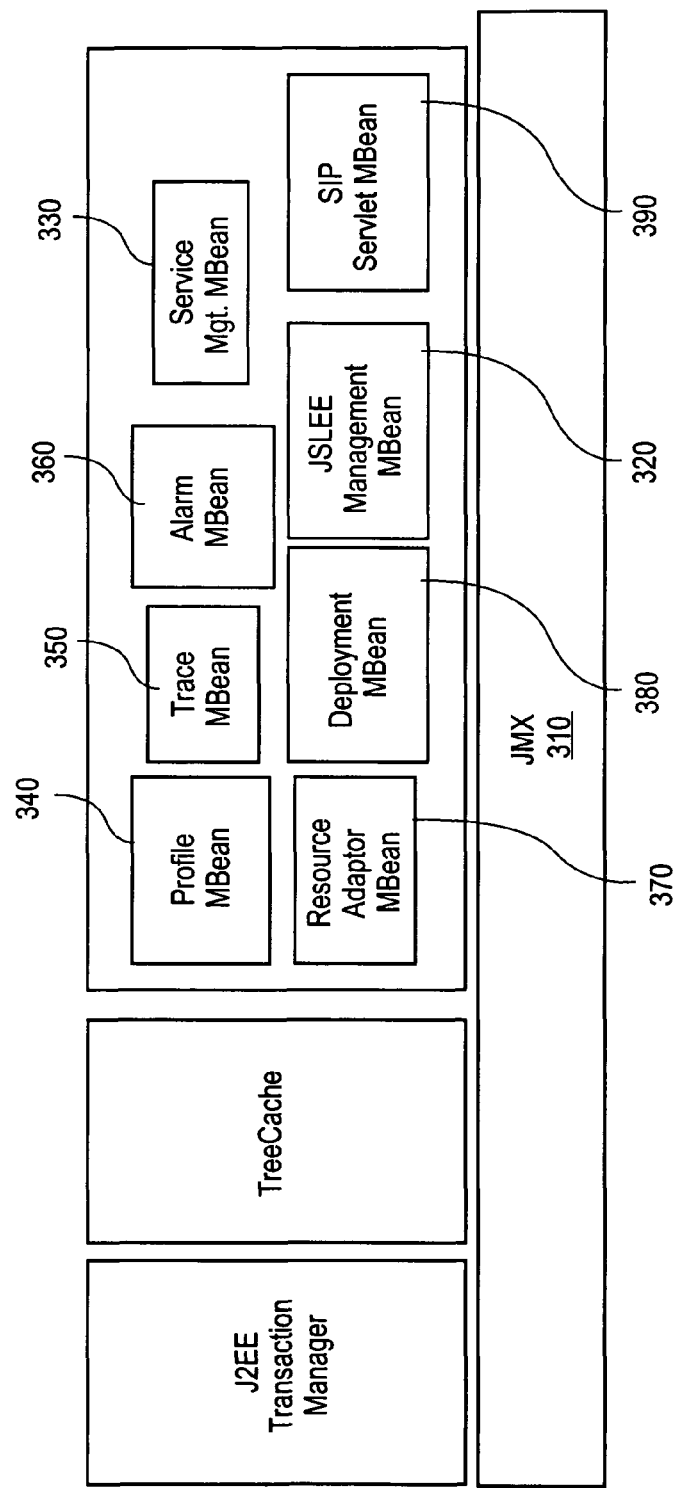
FIG. 3 is a block diagram depicting JSLEE and SIP Servlets as J2EE services according to one embodiment of the invention.

FIG. 3 is a block diagram that depicts the JSLEE and SIP Servlet as J2EE services according to one embodiment of the invention. JMX 310 is a Java™ technology that supplies tools for managing and monitoring applications, system objects, devices (e.g., printers), and service-oriented networks. Those resources are represented by objects called MBeans (for Managed Bean) 320-390. A service is a management artifact in the JSLEE and SIP Servlet. As such, the JSLEE exports a JSLEE Management MBean 320, the SIP Servlet exports a SIP Servlet MBean 390, and each service exports a Service Management MBean 330. In addition, each facility exports an MBean 340-380. The Service Management MBean 330 may be accessed through either of the JSLEE Management MBean 320 and the SIP Servlet MBean 390 that was used to control the service.

Figure 4:
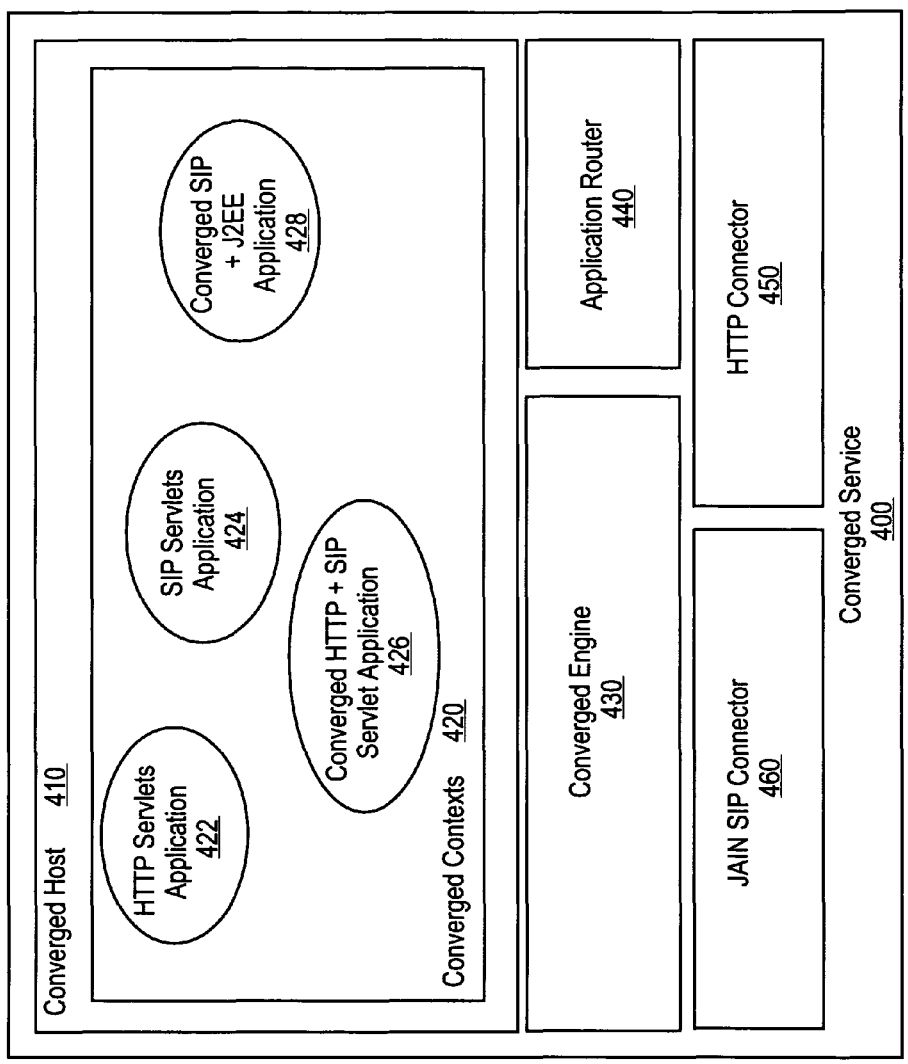
FIG. 4 is a block diagram depicting a SIP Servlets architecture according to an embodiment of the invention.

FIG. 4 is a block diagram depicting a SIP Servlets architecture according to an embodiment of the invention. In one embodiment, SIP Servlet architecture 400 is the same as SIP Servlet AS 180 described with respect to FIG. 1. SIP Servlet architecture 400 includes a converged host 410, converged engine 30, application router 440, HTTP connector 450, and JAIN SIP connector 460. Converged host 410 may include multiple converged contexts 420, such as HTTP Servlets application 422, SIP Servlets application 242, converged HTTP and SIP application 426, and converged SIP and J2EE application 428. Theses converged contexts 422-428 provide different handlers to process requests associated with the protocols supported by the converged context applications 422-428.

Converged host 410 relies on converged engine 430 and application router 440 to receive request for the services of the application 422-428 of converged host 410. Converged engine 430 and application router 440 in turn rely on multiple protocol connectors, such as HTTP connector 450 and JAIN SIP connector 460, for example, to received the requests to be forwarded on. One skilled in the art will appreciate that other connectors that those depicted may be utilized by embodiments of the invention.

In one embodiment, the SIP Servlet applications 422-428 of converged host 410 may rely on JAIN SIP as the SIP stack, such as, for example, JSLEE's SIP RA. The state of the SIP Servlet may be stored mostly in SIP messages and, for example, JBoss™ Cache distributed sessions. This allows for easy recovery and failover support for the SIP Servlet.

Figure 5:
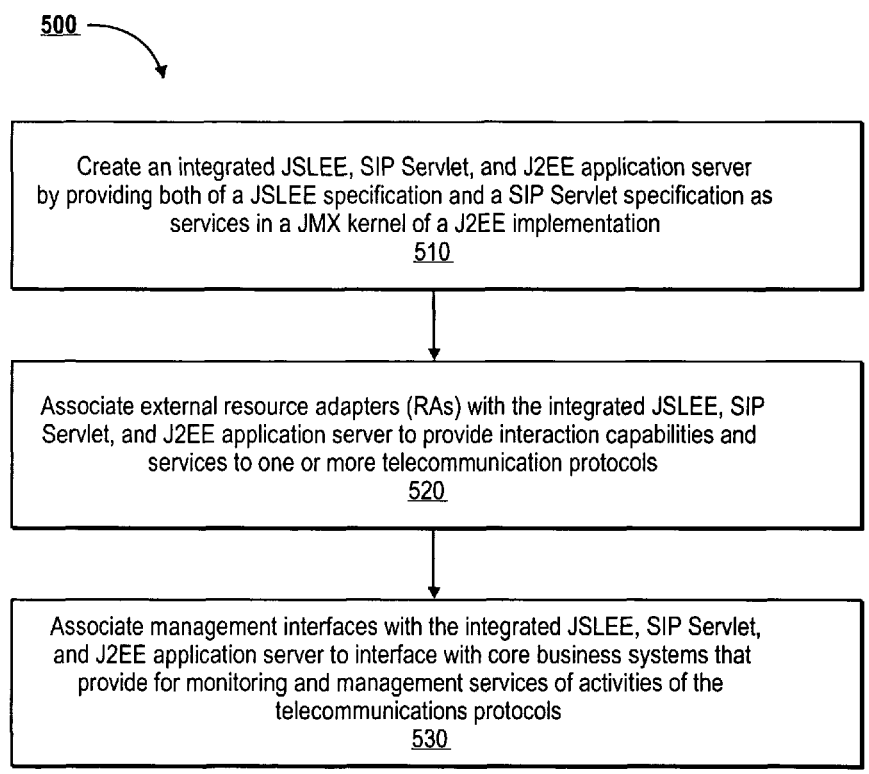
FIG. 5 is a flow diagram illustrating a method for collocating JSLEE, SIP Servlets, and J2EE in a single Java™ virtual machine according to an embodiment of the invention.

FIG. 5 is a flow diagram illustrating a method 500 for collocating JSLEE, SIP Servlets, and J2EE in a single JVM according to an embodiment of the invention. Method 500 may be performed by processing logic that may comprise hardware (e.g., circuitry, dedicated logic, programmable logic, microcode, etc.), software (such as instructions run on a processing device), or a combination thereof. In one embodiment, method 500 may be performed by a communications platform, such as communications platform 100 described with respect to FIG. 1.

Method 500 begins at block 510, where both of a JSLEE specification and a SIP Servlet specification are provided as services in a JMX kernel of a J2EE implementation to create an integrated JSLEE, SIP Servlet, and J2EE application server. Then, at block 520, external RAs are associated with the integrated application server to provide interaction capabilities and services to one or more telecommunications protocols. Lastly, at block 530, management interfaces are associated with the integrated application server to interface with core business systems to provide for monitoring and management services of activities of the telecommunications protocols.

Figure 6:
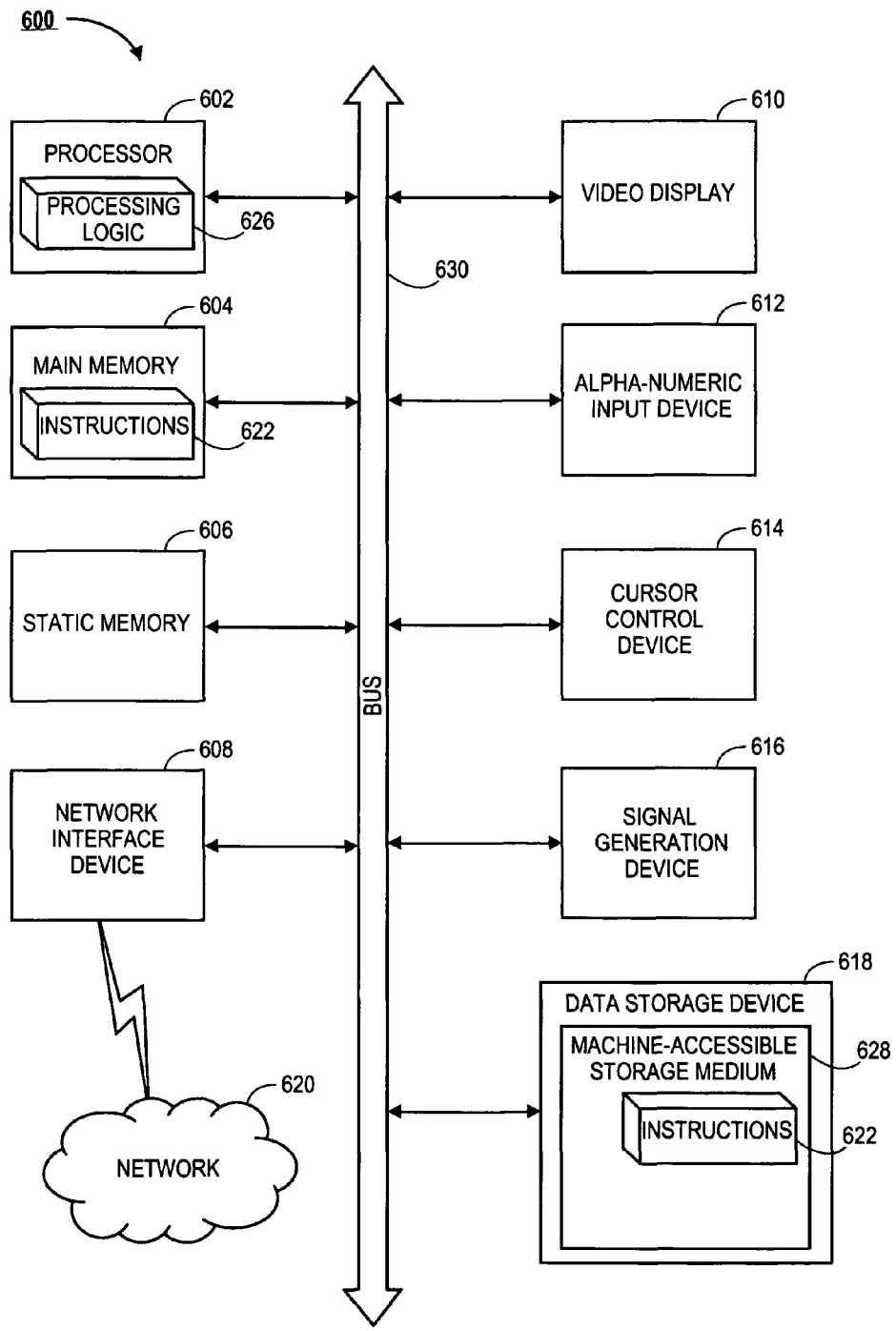
FIG. 6 illustrates a block diagram of one embodiment of a computer system.

FIG. 6 illustrates a diagrammatic representation of a machine in the exemplary form of a computer system 600 within which a set of instructions, for causing the machine to perform any one or more of the methodologies discussed herein, may be executed. In alternative embodiments, the machine may be connected (e.g., networked) to other machines in a LAN, an internet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 600 includes a processing device 602, a main memory (DRAM) (such as synchronous DRAM (SDRAM) or Rambus DRAM (RDRAM), etc.), a static memory 606 (e.g., flash memory, static random access memory (SRAM), etc.), and a data storage device 618, which communicate with each other via a bus 630.

Processing device 602 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 602 may also be one or more special-purpose processing devices such as an application specific integrated circuit (ASIC), a field programmable gate array (FPGA), a digital signal processor (DSP), network processor, or the like. The processing device 602 is configured to execute the processing logic 626 for performing the operations and steps discussed herein.

The computer system 600 may further include a network interface device 608. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 616 (e.g., a speaker).

The data storage device 618 may include a machine-accessible storage medium 628 on which is stored one or more set of instructions (e.g., software 622) embodying any one or more of the methodologies of functions described herein. The software 622 may also reside, completely or at least partially, within the main memory 604 and/or within the processing device 602 during execution thereof by the computer system 600; the main memory 604 and the processing device 602 also constituting machine-accessible storage media. The software 622 may further be transmitted or received over a network 620 via the network interface device 608.

The machine-readable storage medium 628 may also be used to implement embodiments of communications platform 100 described with respect to FIG. 1, and/or a software library containing methods that call the above applications. While the machine-accessible storage medium 628 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instruction for execution by the machine and that cause the machine to perform any one or more of the methodologies of the present invention. The term "machine-accessible storage medium" shall accordingly be taken to include, but not be limited to, solid-state memories, and optical and magnetic media.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as the invention.

What is claimed is:

1. A system, comprising:
a memory;
a processing device communicably coupled to the memory;
an integrated application server executable from the memory by the processing device, the integrated application server comprising:
a Java™ application programming interfaces (APIs) for Intelligent Networks Service Logic Execution Environment (JSLEE) application server comprising a plurality of first management bean (MBean) objects each representing a service provided by the JSLEE application server;
a Session Initiation Protocol (SIP) Servlets application server comprising a plurality of second MBean objects each representing a service provided by the SIP application server; and
a Java™ Enterprise Edition (J2EE) application server to receive the plurality of first MBean objects when exported from the JSLEE application server to the J2EE application server and to receive the plurality of second MBean objects when exported from the SIP application server to the J2EE application server;
wherein the JSLEE application server and the SIP Servlets application server are provided as services in a Java™ Management Extensions (JMX) kernel of the J2EE application server by installing the received first and second Mbean objects of the JSLEE application server and of the SIP application server as logically-separate microkernel services of the J2EE application server;

wherein the JSLEE application server, the SIP Servlets application server, and the J2EE application server are integrated together as a single stack running in a single JAVA virtual machine (JVM) to create the integrated application server that shares a common microkernel architecture comprising the JMX kernel;

wherein, within the integrated application server, components of the JSLEE application server comprising service building blocks (SBBs), components of the SIP Servlets application server comprising SIP servlets, and components of the J2EE application server comprising Enterprise Java™ Beans (EJBs) and HyperText Transport Protocol (HTTP) Servlets each communicate with one another via local in-VM passes by reference semantics; and wherein the components of the JSLEE application server and the components of the SIP Servlets application server utilize services and tools provided by the J2EE application server;

a network abstraction component comprising resource adapters, the network abstraction component executable from the memory by the processing device and communicably coupled to the integrated application server, the resource adapters to provide network connectivity and network protocol abstraction between applications executing on the integrated application server device and any network; and management interfaces executable from the memory by the processing device and communicably coupled to the integrated application server, the management interfaces provide APIs to the integrated application server device for integration with business systems.

2. The system of claim 1, wherein the one or more resource adapters comprise at least one of Session Initiation Protocol (SIP), Extensible Messaging and Presence Protocol (XMPP), GoogleTalk voice over Internet Protocol (VoIP) client application, Asterisk telephone private branch exchange (PBX) software implementation, Parlay API for a telephone network, Real-Time Transport Protocol (RTP), Short Message Peer-to-Peer Protocol (SMPP), Intelligent Network Application Part (INAP), HyperText Transport Protocol (HTTP), or Production Rules.

3. The system of claim 1, wherein the management interfaces comprise at least one of internal system APIs, resource adapter APIs, or application APIs.

4. The system of claim 1, wherein each of the management interfaces is installed as a logically separate microkernel service of the J2EE application server.

5. The system of claim 1, wherein the J2EE application server is an application building platform that provides one or more facilities that the both of the JSLEE application server and the SIP Servlets application server use, the one or more facilities comprising at least one of JBoss™ application server cache, Java™ Management Extensions (JMX) toolkit, Java™ Naming and Directory Interface (JNDI), JavaAssist™ library, or JBoss™ application server clustering service.

6. The system of claim 1, wherein the JSLEE application server exports a JSLEE application server management MBean, the SIP Servlets application server exports a SIP Servlet MBean, each service of the JSLEE application server and the SIP Servlets application server exports a service management MBean, and each facility exports a facility MBean into the J2EE application server.

7. The system of claim 1, wherein the one or more resources adapters to provide interaction capabilities and services to one or more telecommunications protocols, and wherein the management interfaces to interface with core business systems to provide for monitoring and management services of activities of the telecommunications protocols.

8. A computer-implemented method, comprising:
integrating, by a processing device, Java™ application programming interfaces (APIs) for Intelligent Networks Service Logic Execution Environment (JSLEE) application server, Session Initiation Protocol (SIP) Servlet application server, and Java™ Enterprise Edition (J2EE) application server together in a single stack running in a single JAVA virtual machine (JVM) to create an integrated application server that shares a common microkernel architecture, wherein:

the JSLEE application server comprises a plurality of first management bean (MBean) objects each representing a service provided by the JSLEE application server;

the SIP Servlets application server comprising a plurality of second MBean objects each representing a service provided by the SIP application server;

the J2EE application server to receive the plurality of first MBean objects when exported from the JSLEE application server to the J2EE application server and to receive the plurality of second MBean objects when exported from the SIP application server to the J2EE application server; and wherein the JSLEE application server and the SIP Servlets application server are provided as services in a Java™ Management Extensions (JMX) kernel comprising the common microkernel architecture of the J2EE application server by installing the received first and second Mbean objects of the JSLEE application server and of the SIP application server as logically-separate microkernel services of the J2EE application server;

wherein, within the integrated application server, components of the JSLEE application server comprising service building blocks (SBBs), components of the SIP Servlets application server comprising SIP servlets, and components of the J2EE application server comprising Enterprise Java™ Beans (EJBs) and HyperText Transport Protocol (HTTP) Servlets each communicate with one another via local in-VM passes by reference semantics; and wherein the components of the JSLEE application server and the components of the SIP Servlets application server utilize services and tools provided by the J2EE application server;

associating, by the processing device, a network abstraction component comprising resource adapters with the integrated application server, the resource adapters to provide network connectivity and network protocol abstraction between applications executing on the integrated application server device and any network; and connecting, by the processing device, management interfaces with the integrated application server, the management interfaces provide APIs to the integrated application server device for integration with business systems.

9. The method of claim 8, wherein associating the one or more resources adapters provides interaction capabilities and services to one or more telecommunications protocols.

10. The method of claim 9, wherein the management interfaces interface with core business systems to provide for monitoring and management services of activities of the telecommunications protocols.

11. The method of claim 8, wherein the one or more resource adapters comprise at least one of Session Initiation Protocol (SIP), Extensible Messaging and Presence Protocol (XMPP), GoogleTalk voice over Internet Protocol (VoIP) client application, Asterisk telephone private branch exchange (PBX) software implementation, Parlay API for a telephone network, Real-Time Transport Protocol (RTP), Short Message Peer-to-Peer Protocol (SMPP), Intelligent Network Application Part (INAP), HyperText Transport Protocol (HTTP), or Production Rules.

12. The method of claim 8, wherein the one or more management interfaces comprise at least one of internal system APIs, resource adapter APIs, or application APIs.

13. The method of claim 8, wherein each of the management interfaces is installed as a logically separate microkernel service of the J2EE application server.

14. The method of claim 8, wherein the J2EE application server is an application building platform that provides one or more facilities that the both of the JSLEE application server and the SIP Servlets application server use, the one or more facilities comprising at least one of JBoss™ application server cache, Java™ Management Extensions (JMX) toolkit, Java™ Naming and Directory Interface (JNDI), JavaAssist™ library, or JBoss™ application server clustering service.

15. The method of claim 8, wherein the JSLEE application server exports a JSLEE application server management MBean, the SIP Servlets application server exports a SIP Servlet MBean, each service of the JSLEE application server and the SIP Servlets application server exports a service management MBean, and each facility exports a facility MBean into the J2EE application server.

16. A non-transitory machine-readable storage medium including instructions that, when accessed by a processing device, cause the processing device to perform operations comprising:
    integrating, by the processing device, Java™ application programming interfaces (APIs) for Intelligent Networks Service Logic Execution Environment (JSLEE) application server, Session Initiation Protocol (SIP) Servlet application server, and Java™ Enterprise Edition (J2EE) application server together in a single stack running in a single JAVA virtual machine (JVM) to create an integrated application server that shares a common microkernel architecture, wherein:
        the JSLEE application server comprises a plurality of first management bean (MBean) objects each representing a service provided by the JSLEE application server;
        the SIP Servlets application server comprising a plurality of second MBean objects each representing a service provided by the SIP application server;
        the J2EE application server to receive the plurality of first MBean objects when exported from the JSLEE application server to the J2EE application server and to receive the plurality of second MBean objects when exported from the SIP application server to the J2EE application server; and
        wherein the JSLEE application server and the SIP Servlets application server are provided as services in a Java™ Management Extensions (JMX) kernel comprising the common microkernel architecture of the J2EE application server by installing the received first and second Mbean objects of the JSLEE application server and of the SIP application server as logically-separate microkernel services of the J2EE application server;
        wherein, within the integrated application server, components of the JSLEE application server comprising service building blocks (SBBs), components of the SIP Servlets application server comprising SIP servlets, and components of the J2EE application server comprising Enterprise Java™ Beans (EJBs) and HyperText Transport Protocol (HTTP) Servlets each communicate with one another via local in-VM passes by reference semantics; and
        wherein the components of the JSLEE application server and the components of the SIP Servlets application server utilize services and tools provided by the J2EE application server;
    associating, by the processing device, a network abstraction component comprising resource adapters with the integrated application server, the resource adapters to provide network connectivity and network protocol abstraction between applications executing on the integrated application server device and any network; and
    connecting, by the processing device, management interfaces with the integrated application server, the management interfaces provide APIs to the integrated application server device for integration with business systems.

17. The non-transitory machine-readable storage medium of claim 16, wherein the creating further comprises providing a specification of the JSLEE application server and a specification of the SIP Servlet application server as services in a Java™ Management Extensions (JMX) kernel of the J2EE application server.

18. The non-transitory machine-readable storage medium of claim 16, wherein associating the one or more resources adapters provides interaction capabilities and services to one or more telecommunications protocols.

19. The non-transitory machine-readable storage medium of claim 16, wherein the J2EE application server is an application building platform that provides one or more facilities that the both of the JSLEE application server and the SIP Servlets application server use, the one or more facilities comprising at least one of JBoss™ application server cache, Java™ Management Extensions (JMX) toolkit, Java™ Naming and Directory Interface (JNDI), JavaAssist™ library, or JBoss™ application server clustering service.

20. The non-transitory machine-readable storage medium of claim 16, wherein the JSLEE application server exports a JSLEE application server management MBean, the SIP Servlets application server exports a SIP Servlet MBean, each service of the JSLEE application server and the SIP Servlets application server exports a service management MBean, and each facility exports a facility MBean into the J2EE application server.

* * * * *